(12) United States Patent
Park et al.

(10) Patent No.: US 10,641,714 B2
(45) Date of Patent: May 5, 2020

(54) WAFER INSPECTION APPARATUS

(71) Applicants: KOREA BASIC SCIENCE INSTITUTE, Daejeon (KR); KOREA INSTITUTE OF SCIENCE AND TECHNOLOGY, Seoul (KR)

(72) Inventors: Seung-young Park, Daejeon (KR); Sang-il Kim, Busan (KR); Younghun Jo, Daejeon (KR); Byoung-Chul Min, Seoul (KR)

(73) Assignees: KOREA BASIC SCIENCE INSTITUTE (KR); KOREA INSTITUTE OF SCIENCE AND TECHNOLOGY (KR)

( * ) Notice: Subject to any disclaimer, the term of this patent is extended or adjusted under 35 U.S.C. 154(b) by 60 days.

(21) Appl. No.: 15/974,111

(22) Filed: May 8, 2018

(65) Prior Publication Data

US 2018/0364181 A1 Dec. 20, 2018

(30) Foreign Application Priority Data

Jun. 15, 2017 (KR) .......................... 10-2017-0075927

(51) Int. Cl.
*G01N 22/02* (2006.01)

(52) U.S. Cl.
CPC .................................. *G01N 22/02* (2013.01)

(58) Field of Classification Search
None
See application file for complete search history.

(56) References Cited

U.S. PATENT DOCUMENTS

| | | | | |
|---|---|---|---|---|
| 5,010,299 | A * | 4/1991 | Nishizawa | G01N 27/72 324/209 |
| 6,297,634 | B1 * | 10/2001 | Aoki | G01R 33/383 324/315 |
| 6,411,105 | B1 * | 6/2002 | Liu | G01N 17/006 324/639 |
| 2004/0100278 | A1 * | 5/2004 | Haycock | G01R 33/60 324/637 |
| 2018/0267128 | A1 * | 9/2018 | Guisan | G01R 31/318511 |

* cited by examiner

*Primary Examiner* — Jas A Sanghera
(74) *Attorney, Agent, or Firm* — Mendelsohn Dunleavy, P.C.

(57) ABSTRACT

Disclosed is a wafer inspection apparatus. The wafer inspection apparatus includes: a magnetic field generating unit forming a magnetic field such that magnetic lines of force flow in a direction perpendicular or parallel to a first surface of a wafer on which a magnetic thin film is formed; a microwave guide unit emitting microwaves to a measurement region that is at least a partial region of the wafer and is a region affected by the magnetic field generated by the magnetic field generating unit; and a sensing unit receiving waves reflected or transmitted after the microwaves are emitted to the measurement region from the microwave guide unit.

18 Claims, 5 Drawing Sheets

WAFER INSPECTION APPARATUS

CROSS REFERENCE TO RELATED APPLICATION

The present application claims priority to Korean Patent Application No. 10-2017-0075927, filed Jun. 15, 2017, the entire contents of which is incorporated herein for all purposes by this reference.

BACKGROUND OF THE INVENTION

Field of the Invention

The present invention relates generally to a wafer inspection apparatus and, more particularly, to a wafer inspection apparatus capable of inspecting magnetic properties of a wafer on which a magnetic thin film is formed, without destructing the wafer for sample preparation.

Description of the Related Art

As well known in the art, in order to measure magnetic properties such as magnetic moment of a magnetic thin film formed on a wafer by deposition, there are methods such as a method of measuring the magnetic moment of a magnetic body using a vibrating sample magnetometer, a squid magnetometer, etc., a sign method using a magnetic compass, a method of measuring magnetic flux density according to distance, etc.

FIG. 1 shows a view schematically showing a wafer inspection apparatus according to the related art. Referring to FIG. 1, the wafer inspection apparatus according to the related art is provided with two electromagnets 14. Furthermore, a sample 10, prepared by removing a part of a wafer on which a magnetic thin film is formed, is mounted on a sample holder 12 and reciprocates vertically as it vibrates in a magnetic field formed in a space 16 between the two electromagnets 14.

As such, the sample 10 is allowed to reciprocate vertically in the magnetic field 16 to measure the magnetic properties of the magnetic thin film, whereby it is determined whether the magnetic thin film is properly formed on the sample 10.

However, the wafer inspection apparatus according to the related art has the following problems.

At least a part of the wafer must be destructed to prepare the sample in order to inspect the magnetic thin film formed on the wafer, causing the wafer itself on which the magnetic thin film is formed to be made useless. In addition, it is time-consuming and troublesome to perform an inspection process such as cutting the sample to a proper size, mounting it on the sample holder, placing it between the electromagnets, etc. Moreover, because sampling inspection is performed on the basis of a representative wafer, it is difficult to say that measurement accuracy of magnetic thin films formed on other wafers.

Thus, a technique for measuring and inspecting magnetic properties without destructing a wafer has been required.

SUMMARY OF THE INVENTION

Accordingly, the present invention has been made keeping in mind the above problems occurring in the related art, and the present invention provides a wafer inspection apparatus capable of non-destructively measuring and inspecting magnetic properties of a magnetic thin film formed on a wafer without damaging the wafer.

In order to achieve the above object, according to one aspect of the present invention, there is provided a wafer inspection apparatus, including: a magnetic field generating unit forming a magnetic field such that magnetic lines of force flow in a direction perpendicular or parallel to a first surface of a wafer on which a magnetic thin film is formed; a microwave guide unit emitting microwaves to a measurement region that is at least a partial region of the wafer and is a region affected by the magnetic field generated by the magnetic field generating unit; and a sensing unit receiving waves reflected or transmitted after the microwaves are emitted to the measurement region from the microwave guide unit.

Herein, the sensing unit may include at least one of an antenna, a pick up coil, and a waveguide.

Herein, the wafer inspection apparatus may further include: a wafer stage supporting at least a part of the wafer, wherein the wafer stage allows the wafer to be changed in position such that the measurement region on the wafer is changed in position.

Further, a motion type in which the wafer is changed in position by the wafer stage may include at least one of a linear motion, a curved motion, and a vibration motion.

Herein, the wafer inspection apparatus may further include: a position adjustment unit changing a relative position of at least one of the magnetic field generating unit, the microwave guide unit, and the sensing unit with respect to an arbitrary point on the wafer, such that the measurement region on the wafer is changed in position.

Herein, the magnetic field generating unit may include: a magnetic body inducing the magnetic lines of force in a direction toward the wafer; and a coil wound so as to surround at least a part of the magnetic body such that electric power is supplied from outside and the magnetic lines of force are induced from the magnetic body to form the magnetic field.

Further, the magnetic body may have at least a part having one of E, I, J, L, and U shapes.

Further, the wafer inspection apparatus may further include an adiabatic material provided between the coil and the wafer to prevent heat generated in the coil from being transmitted to the wafer.

Further, the magnetic body may be one of a permanent magnet and an electromagnet, or may be composed of a combination of the permanent magnet and the electromagnet.

Further, the coil may include: a DC coil forming a DC magnetic field by being supplied with DC power from the outside; and an AC coil forming an AC magnetic field by being supplied with AC power from the outside.

Further, intensity of the DC magnetic field formed by the DC coil may be greater than intensity of the AC magnetic field formed by the AC coil.

Herein, the microwave guide unit may include a first rectangular waveguide emitting the microwaves to the measurement region where the magnetic lines of force are transmitted in the direction perpendicular to the first surface of the wafer by the magnetic field generating unit.

Herein, the microwave guide unit may include a second rectangular waveguide emitting the microwaves to the measurement region where the magnetic lines of force are formed in the direction parallel to the first surface of the wafer.

Herein, the microwave guide unit may include a coplanar waveguide emitting the microwaves to the measurement region.

Herein, the microwave guide unit may include: a first rectangular waveguide emitting the microwaves to the measurement region where the magnetic lines of force are transmitted in the direction perpendicular to the first surface of the wafer by the magnetic field generating unit; a second rectangular waveguide emitting the microwaves to the measurement region where the magnetic lines of force are formed in the direction parallel to the first surface of the wafer; and a coplanar waveguide emitting the microwaves to the measurement region.

Further, the first rectangular waveguide and the coplanar waveguide may be arranged to be distanced from the first surface of the wafer by a predetermined distance, and the second rectangular waveguide may be arranged to be distanced from a second surface of the wafer by a predetermined distance, so that the microwaves are emitted to the measurement region.

Herein, the wafer inspection apparatus may further include a signal processing unit receiving an electrical signal from the sensing unit and analyzing the received electrical signal, wherein the sensing unit receives the waves reflected or transmitted and converts the received waves into the electrical signal, and the signal processing unit analyzes information on the electrical signal received from the sensing unit, frequency of the microwaves emitted to the measurement region, and the magnetic field applied to the measurement region by the magnetic field generating unit and thus obtains magnetic information on the measurement region of the wafer.

Further, the signal processing unit may obtain, from the information on the electrical signal, the frequency, and the magnetic field, at least one of information including a change in effective saturation magnetization $M_{eff}$, a change in effective damping constant $\alpha_{eff}$, a thickness t of a ferromagnetic layer, and zero-frequency full width at half maximum $\Delta H_0$ based on the following equation, $$f_0 = \frac{\gamma}{2\pi}\sqrt{H_0(H_0 + 4\pi M_{eff})}$$

$$M_{eff} = M_s + \frac{H_s}{4\pi}, \quad H_s = \frac{2K_A}{t \cdot M_S}$$

$$\Delta H_{eff}(f_0) = \left(\frac{4\pi\alpha_{eff}}{\gamma}f_0 + \Delta H_0\right)$$

$$\alpha_{eff} = \alpha_{FM} + \alpha_{SP} + \alpha_{MA}$$

(Herein, $f_0$: resonance frequency,
$H_0$: resonance magnetic field,
$\gamma$: gyro magnetic ration,
$M_{eff}$: effective saturation magnetization,
$M_B$: saturation magnetization,
$H_B$: uniaxial anisotropy magnetic field,
$K_A$: uniaxial anisotropy constant,
t: the thickness of the ferromagnetic layer,
$\alpha_{eff}$: effective damping constant,
$\alpha_{FM}$: damping constant of a ferromagnetic material itself,
$\alpha_{SP}$: spin-pumping damping constant according to bonding of a metal material to the ferromagnetic material,
$\alpha_{MA}$: damping constant due to an interface between the ferromagnetic material and the metal material,
$\Delta H_{eff}$: effective full width at half maximum,
$\Delta H_0$: the zero-frequency full width at half maximum.).

The wafer inspection apparatus according to the present invention can measure and inspect the magnetic properties of the magnetic thin film formed on the wafer in a non-destructive manner in which the wafer is not damaged for sample preparation, thus eliminating wafer damage. In addition, it is possible to perform the measurement directly on the wafer itself on which the magnetic thin film is formed without preparing and measuring a sample as in the related art, thus improving productivity and quality.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
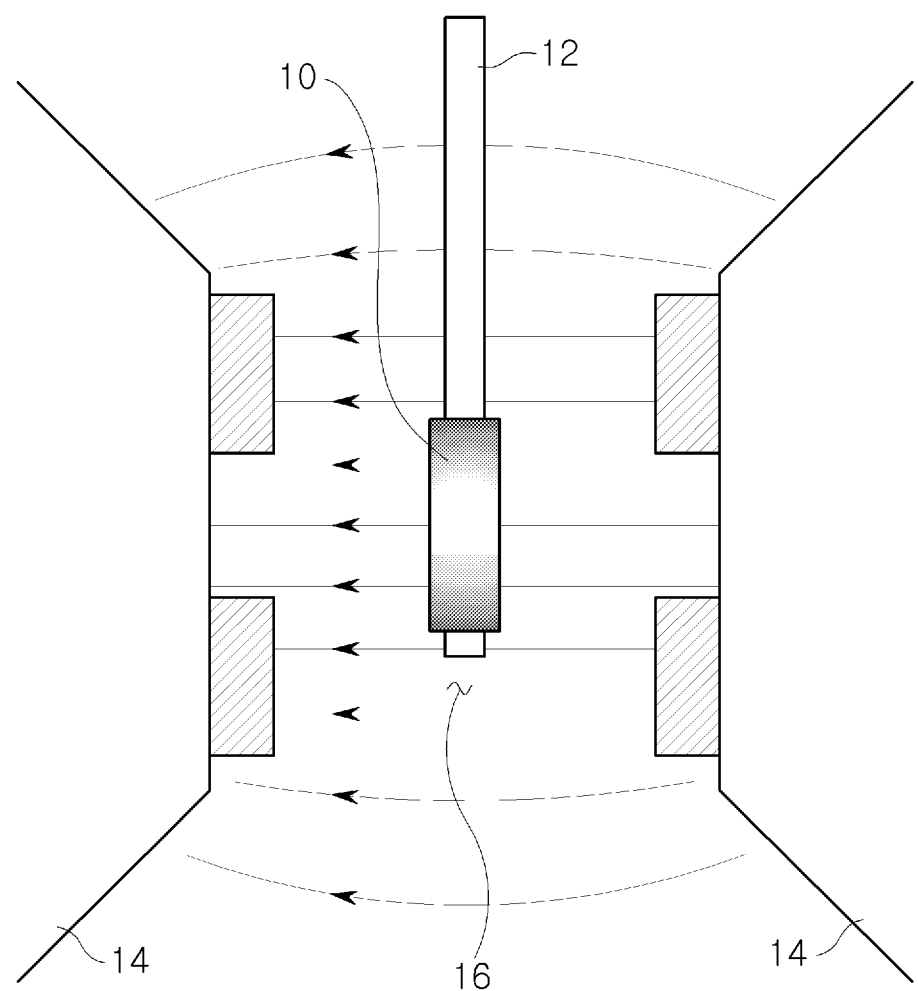
FIG. 1 shows a view schematically showing a wafer inspection apparatus according to the relate art.

Hereinbelow, exemplary embodiments of the present invention will be described in detail with reference to the accompanying drawings. Throughout the drawings, the same reference numerals will refer to the same or like parts.

Figures 2A, 2B, 2C, 2D:
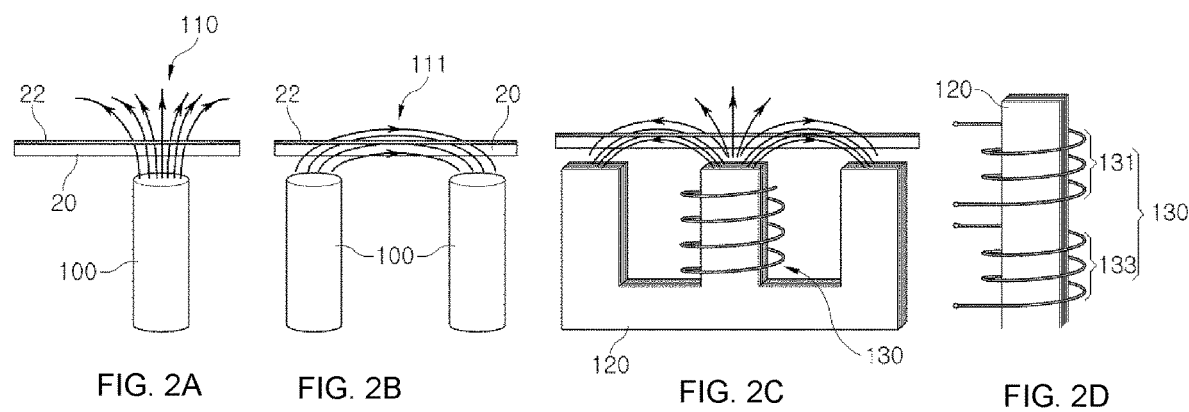
FIGS. 2A-2D show views schematically showing a part of a magnetic field generating unit of a wafer inspection apparatus according to an embodiment of the present invention.
Figures 3A, 3B, 3C:
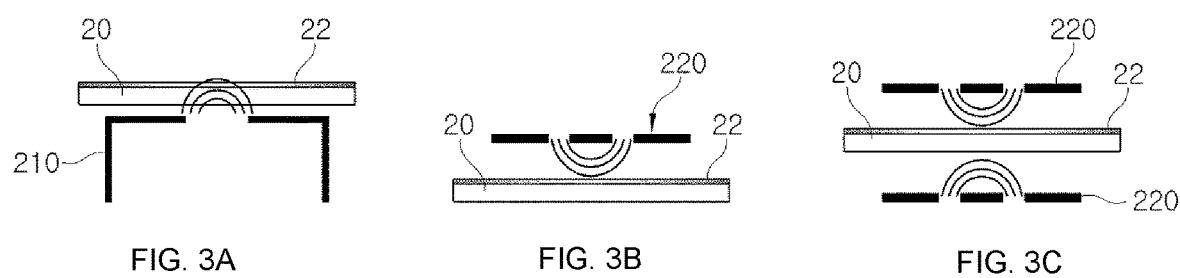
FIGS. 3A-3C show views schematically showing a part of a microwave guide unit in the wafer inspection apparatus according to the embodiment of the present invention.
Figure 4A:
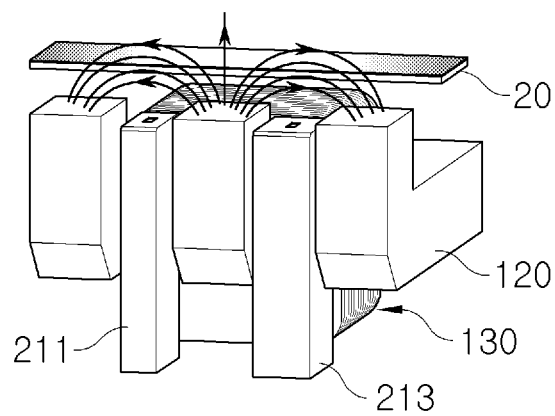
FIGS. 4A and 4B show views schematically showing arrangement of the magnetic field generating unit and the microwave guide unit in the wafer inspection apparatus according to the embodiment of the present invention.
Figure 4B:
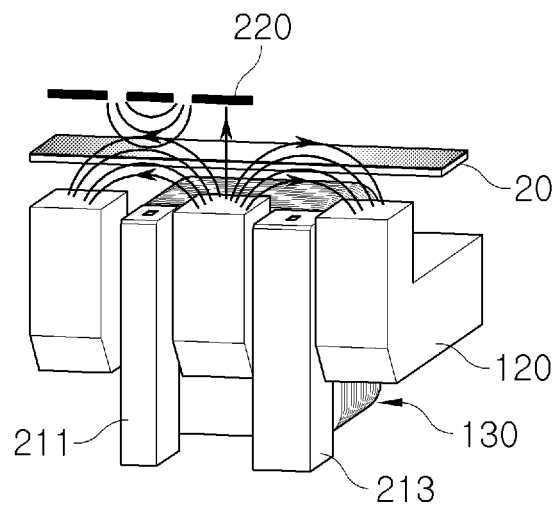
Figure 5A:
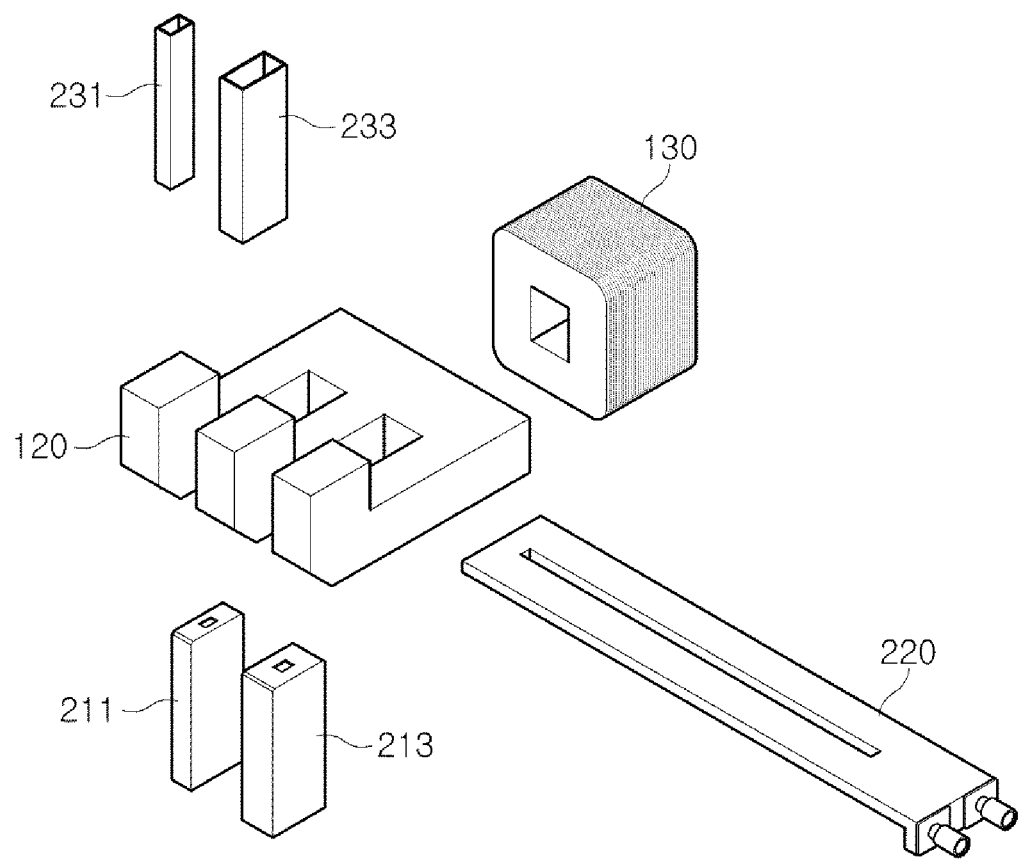
FIGS. 5A and 5B show an exploded perspective view and a perspective view schematically showing the magnetic field generating unit and the microwave guide unit in the wafer inspection apparatus according to the embodiment of the present invention.
Figure 5B:
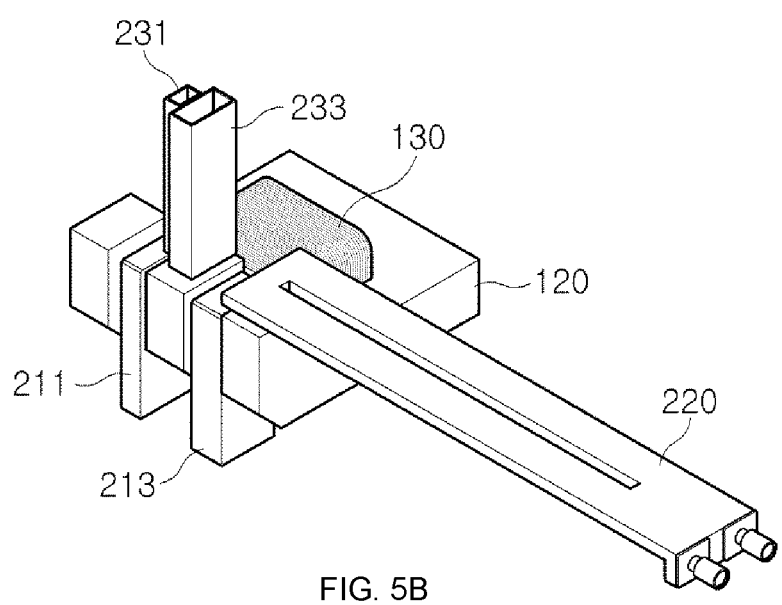
Figure 6A:
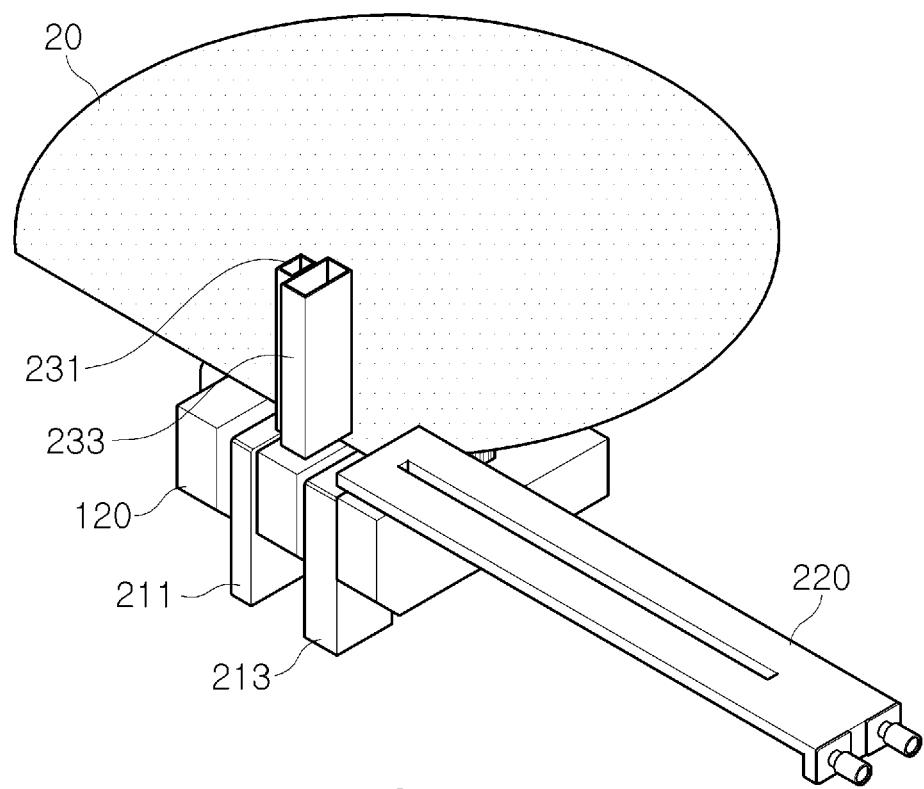
FIGS. 6A and 6B show a perspective view and a front view schematically showing the magnetic field generating unit, the microwave guide unit, and a wafer to be measured of the wafer inspection apparatus according to the embodiment of the present invention.
Figure 6B:
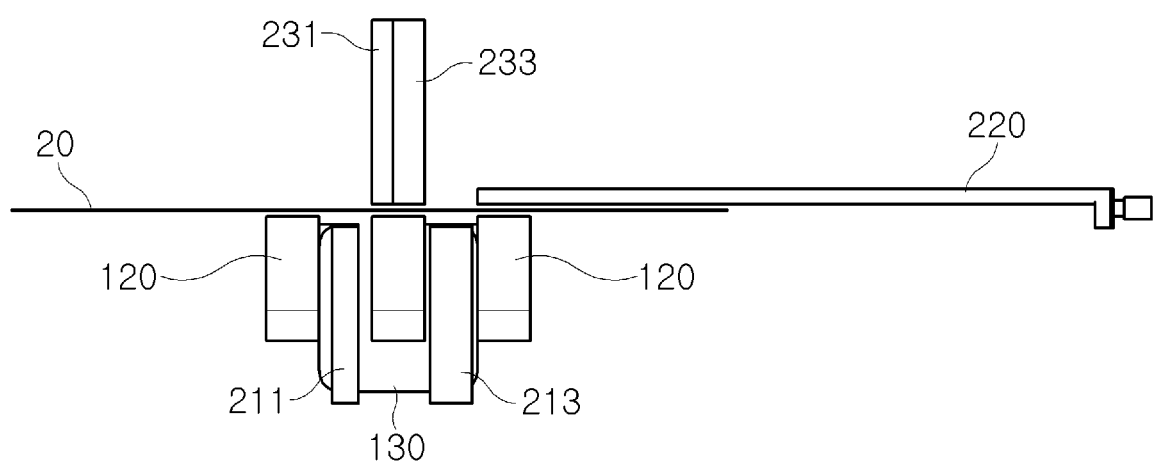

FIG. 1 shows a view schematically showing a wafer inspection apparatus according to the relate art, FIGS. 2A-2D show views schematically showing a part of a magnetic field generating unit of a wafer inspection apparatus according to an embodiment of the present invention, FIGS. 3A-3C show views schematically showing a part of a microwave guide unit in the wafer inspection apparatus according to the embodiment of the present invention, FIGS. 4A and 4B show views schematically showing arrangement of the magnetic field generating unit and the microwave guide unit in the wafer inspection apparatus according to the embodiment of the present invention, FIGS. 5A and 5B show an exploded perspective view and a perspective view schematically showing the magnetic field generating unit and the microwave guide unit in the wafer inspection apparatus according to the embodiment of the present invention, and FIGS. 6A and 6B show a perspective view and a front view schematically showing the magnetic field generating unit, the microwave guide unit, and a wafer to be measured of the wafer inspection apparatus according to the embodiment of the present invention.

Referring to FIGS. 2A-2D to FIGS. 6A and 6B, the wafer inspection apparatus according to the embodiment of the present invention includes the magnetic field generating unit, the microwave guide unit, and a sensing unit, and it is more preferable that the wafer inspection apparatus further includes at least one of a wafer stage, a position adjustment unit, and a signal processing unit.

Hereinafter, a measurement region referred to in describing the wafer inspection apparatus according to the embodiment of the present invention refers to at least a partial region of the wafer, which is a region affected by a magnetic field formed by the magnetic field generating unit.

The magnetic field generating unit forms the magnetic field such that magnetic lines of force 110 and 111 flow in a direction perpendicular or parallel to a first surface of the wafer 20 on which the magnetic thin film 22 is formed.

It is preferable that the magnetic field generating unit includes a magnetic body and a coil.

The magnetic body 100 induces the magnetic lines of force 110 and 111 in a direction toward the wafer. In other words, the magnetic lines of force 110 are induced to flow perpendicularly to the first surface of the wafer 20 as shown in FIG. 2A, or the magnetic lines of force 111 are induced to flow parallel to the first surface of the wafer 20 as shown in FIG. 2B.

A magnet or an electromagnet may be used as the magnetic body 100, and a coil is omitted in FIGS. 2A and 2B.

Furthermore, as shown in FIGS. 2C and 2D, it is preferable that a coil 130 is wound so as to surround at least a part of a magnetic body 120 such that electric power is supplied from outside and the magnetic lines of force are induced from the magnetic body to form the magnetic field.

In order to measure magnetic properties such as magnetic moment, effective saturation magnetization $M_{eff}$, etc. in the wafer 20 on which the magnetic thin film 22 is formed, the magnetic field is applied to the measurement region of the wafer 20. Herein, as shown in FIG. 2A, the magnetic field may be applied such that the magnetic lines of force 110 flow in the direction perpendicular to the first surface of the wafer.

Alternatively, as shown in FIG. 2B, the magnetic field may be applied such that the magnetic lines of force 111 flow in the direction parallel to the first surface of the wafer 20.

As shown in FIG. 2C, it is more preferable that the magnetic field is applied such that the magnetic lines of force are formed in both the perpendicular direction and the parallel direction to the first surface of the wafer 20, whereby the magnetic properties of the magnetic thin film in the measurement region are ascertained by performing one measurement.

For this purpose, as shown in FIG. 2C, it is also preferable that the magnetic field is applied such that the magnetic lines of force are formed in the perpendicular direction and in the parallel direction to the measurement region.

In order to allow the magnetic lines of force to be formed in the perpendicular direction and in the parallel direction as described above, it is preferable that the magnetic body 120 has at least a part having one of E, I, J, L, and U shapes.

FIG. 2C, and FIGS. 4A and 4B or FIGS. 5A and 5B exemplarily show that the magnetic body 120 has at least a part having an E shape.

Furthermore, it is preferable that the magnetic body 120 is composed of ferrite. Alternatively, it is also preferable that the magnetic body 120 is one of a permanent magnet and an electromagnet, or is composed of a combination of the permanent magnet and the electromagnet.

In addition, as shown in FIG. 2C, it is more preferable that an E-shaped plate ferrite or a steel plate is formed to have a laminated structure.

As such, if the ferrite or the steel plate, which is the magnetic body, is formed to have the laminated structure, occurrence of an eddy current can be suppressed.

Furthermore, it is preferable that an adiabatic material is provided between the coil and the wafer to prevent heat generated in the coil from being transmitted to the wafer. It is also preferable that an adiabatic membrane is used as the adiabatic material.

Meanwhile, it is preferable that the coil 130 includes a DC coil 133 and an AC coil 131 such that a direct current magnetic field (DC magnetic field) and an alternating current magnetic field (AC magnetic field) are applied together to the measurement region on the wafer.

The AC coil is positioned at any one of positions on a magnetic closed loop.

Herein, the DC coil 133 is a coil for forming the DC magnetic field by being supplied with DC power from outside, and the AC coil 131 is a coil for forming the AC magnetic field by being supplied with AC power from outside.

Herein, it is preferable that intensity of the DC magnetic field is greater than intensity of the AC magnetic field.

For reference, if the AC coil is located at a position away from a pole face, the intensity of the AC magnetic field remains constant independently of the intensity of the DC magnetic field.

On the other hand, it is also possible to supply the AC power and the DC power together to one coil without distinction between the AC and DC coils, so that the DC and AC magnetic fields are applied together. In this case, a differential amplifier or a summing amplifier may be further provided in a preamp stage so as to add an AC waveform to a power amplifier connected to the coil. The preamp stage has at least two input stages, one of which receives a signal for determining DC amplitude, and the other receives an AC signal.

For reference, in an E-shaped electromagnet, a magnetic pole is each end of the E-shape, so that there are three magnetic poles. Herein, in order to ensure uniformity of the magnetic field in a center magnetic pole, it is preferable that the center magnetic pole and neighboring other magnetic poles have the same interval. However, if the uniformity of the magnetic field in the center magnetic pole is not significant, the intervals between the magnetic poles may be different as required.

The microwave guide unit emits microwaves to the measurement region that is at least a partial region of the wafer 20 and is the region affected by the magnetic field generated by the magnetic field generating unit.

The microwave guide unit may include a rectangular waveguide 210 as shown in FIG. 3A, or a coplanar waveguide 220 as shown in FIGS. 3A and 3C.

First, as shown in FIG. 3A, it is preferable that the rectangular waveguide 210 is positioned under the wafer 20 and the microwaves are emitted toward the magnetic thin film 22 formed on the upper surface of the wafer 20.

As shown in FIG. 3B, it is also preferable that the coplanar waveguide 220 is positioned over of the wafer 20 on which the magnetic thin film 22 is formed and the microwaves are emitted toward the magnetic thin film 22 of the wafer 20.

Alternatively, as shown in FIG. 3C, it is also preferable that the coplanar waveguide 220 is positioned both over and under the wafer 20 on which the magnetic thin film 22 is formed and the microwaves are emitted toward the magnetic thin film 22 of the wafer 20.

Of course, although not shown in the drawings, it is also preferable that the rectangular waveguide is provided both over and under the wafer 20.

Alternatively, as shown in FIGS. 4A and 4B, both the rectangular waveguide 210 and the coplanar waveguide 220 are provided.

As shown in FIGS. 4A and 4B, rectangular waveguides 211 and 213 are disposed in recessed portions formed in the ferrite 120, which is the magnetic body, at positions under the wafer 20, and the coil 130 is wound on a part of the ferrite 120. Herein, the ferrite 120 and each of the rectangular waveguides 211 and 213 are distanced from each other rather than being in contact with each other.

Herein, the rectangular waveguides 211 and 213 are determined in size in accordance with frequency of the microwaves to be emitted toward the wafer 20. Thus, as shown in the drawings, at least two rectangular waveguides 211 and 213 may be provided.

If the microwaves are high-frequency waves, the rectangular waveguide 211 has a narrow width, and if the microwaves are low-frequency waves, the rectangular waveguide 213 has a wide width.

Furthermore, as shown in FIG. 4B, it is also preferable that the coplanar waveguide 220 is arranged over the wafer 20 and the rectangular waveguides 211 and 213 are arranged under the wafer 20, and thus the microwaves are emitted toward the wafer 20.

Herein, the rectangular waveguides 211 and 213 and the coplanar waveguide 220 may be moved independently of each other with respect to the wafer.

More specifically, the rectangular waveguides 211 and 213 and the coplanar waveguide 220 may be moved together on the wafer in the same direction by the position adjustment unit, which will be described later, or may be moved in different directions.

Hereinafter, the more detailed description will be given with reference to FIGS. 4A and 4B to FIGS. 6A and 6B. Referring to FIGS. 4A and 4B to FIGS. 6A and 6B, the microwave guide unit may include a first rectangular waveguide, a second rectangular waveguide, and a coplanar waveguide.

The first rectangular waveguides 231 and 233 emit the microwaves to the measurement region where the magnetic lines of force are transmitted in the direction perpendicular to the first surface of the wafer 20 by the magnetic field generating unit.

The first rectangular waveguides 231 and 233 are arranged as shown in FIGS. 5A, 5B, 6A and 6B so as to correspond to a part where the magnetic lines of force start in the perpendicular direction as shown in FIG. 4A. Herein, the first and second rectangular waveguides 231 and 233 may include at least two waveguides such as the first rectangular waveguide 233 for emitting low-frequency microwaves, the first rectangular waveguide 231 for emitting high-frequency microwaves, etc.

Furthermore, the second rectangular waveguides 211 and 213 emit the microwaves to the measurement region where the magnetic lines of force are formed in the direction parallel to the first surface of the wafer by the magnetic field generating unit.

The second rectangular waveguides 211 and 213 are arranged as shown in FIGS. 5A, 5B, 6A and 6B so as to correspond to a part where the magnetic lines of force start in the parallel direction as shown in FIG. 4A.

Herein, the second rectangular waveguides 211 and 213 may include at least two waveguides such as the second rectangular waveguide 213 for emitting low-frequency microwaves, the first rectangular waveguide 211 for emitting high-frequency microwaves, etc.

Because the rectangular waveguide has a limited frequency band, it is preferable that rectangular waveguides of different standards or sizes are arranged between different magnetic poles so as to emit microwaves of different bands.

Furthermore, the coplanar waveguide 220 emits the microwaves to the measurement region where the magnetic lines of force are formed in the direction perpendicular or parallel to the first surface of the wafer 20 by the magnetic field generating unit.

As shown in FIGS. 6A and 6B, the first rectangular waveguides 231 and 233 and the coplanar waveguide 220 are arranged over the first surface of the wafer 20 so as to be distanced therefrom by a predetermined distance, and the second rectangular waveguides 211 and 213 are arranged under a second surface of the wafer 20 so as to be distanced therefrom by a predetermined distance, so that the microwaves are emitted to the measurement region.

As such, the microwaves emitted toward the wafer 20 from the first rectangular waveguides 231 and 233, the second rectangular waveguides 211 and 213, and the coplanar waveguide 220 are reflected or transmitted by the magnetic thin film of the wafer 20, and are then sensed by the sensing unit.

For reference, the coil 130 wound around the ferrite 120, which is the magnetic body of the magnetic field generating unit, may be configured as shown in FIGS. 4A and 4B or may be configured as shown in FIGS. 5A, 5B, 6A and 6B. This configuration may be appropriately selected in consideration of the direction of the magnetic lines of force and the direction of the current flowing in the coil depending on design needs.

As such, the magnetic field generating unit and the microwave guide unit are not allowed to be in contact with the wafer during measurement, so that it is possible to avoid physical damage to the wafer during the measurement.

The sensing unit (not shown) receives waves reflected or transmitted after the microwaves are emitted to the measurement region on the wafer 20 from the microwave guide unit.

It is preferable that the sensing unit is arranged at each of positions that face each other with the wafer 20 interposed therebetween based on the waveguides of the microwave guide unit so as to receive the waves reflected or transmitted by the wafer 20.

The sensing unit preferably includes at least one of an antenna, a pickup coil, and a waveguide.

The sensing unit receives the reflected waves or the transmitted waves of the microwaves, converts the reflected waves or the transmitted waves into an electrical signal, and transmits the electrical signal to the signal processing unit that will be described later, such that the magnetic properties of the magnetic thin film 22 formed on the wafer 20 are determined.

The wafer stage (not shown) is provided such that the wafer 20 is placed thereon while the magnetic properties of the wafer 20 are measured.

It is preferable that the wafer stage is in contact with the edge of the wafer 20 at a position under the wafer 20 so as to support the wafer such that the measurement is performed by the magnetic field generating unit, the microwave guide unit, or the sensing unit.

Furthermore, it is more preferable that the wafer stage is moved with the wafer 20 such that the measurement region on the wafer 20 is changed in position.

It is preferable that a motion type in which the wafer is changed in position by the wafer stage includes at least one of a linear motion, a curved motion, and a vibration motion. Herein, the motion type may denote a moving path that is defined when the wafer is changed in position.

As such, if the wafer stage is moved in a state supporting the wafer 20, the magnetic properties can be measured in a manner in which the entire area of the wafer 2 is scanned.

The position adjustment unit (not shown) changes a relative position of at least one of the magnetic field generating unit, the microwave guide unit, and the sensing unit with respect to an arbitrary point on the wafer such that the measurement region on the wafer is changed in position.

Even though it is preferable for the wafer stage to allow the wafer 20 to be changed in position, it is also preferable that at least one of the magnetic field generating unit, the microwave guide unit, and the sensing unit is moved by the position adjustment unit, while the wafer stage is fixed in position.

As such, it is preferable that the wafer stage is moved to change the wafer 20 in position, while the magnetic field generating unit, the microwave guide unit, and the sensing unit are fixed in position. It is also preferable that at least one of the magnetic field generating unit, the microwave guide unit, and the sensing unit is moved relative to the wafer 20 while the wafer stage is fixed in position without changing the wafer 20 in position.

As such, the wafer 20 is moved, or the magnetic field generating unit, the microwave guide unit, or the sensing unit is moved relative to the wafer, whereby the magnetic properties of the entire area of the wafer 20 can be measured.

Furthermore, it is preferable that a proximity sensor is further included. In other words, the proximity sensor is further provided such that the first rectangular waveguide 231 and 233, the second rectangular waveguide 211 and 213, or the coplanar waveguide 220 is kept distanced from the wafer 20 by a predetermined distance without coming into contact with the wafer 20.

Accordingly, if the proximity sensor is included, the signal processing unit is allowed to determine the distance from the wafer using the proximity sensor.

The signal processing unit (not shown) receives the electrical signal from the sensing unit and analyzes the magnetic properties of the measurement region. In addition, the signal processing unit may control the magnetic field generating unit, the microwave guide unit, and the sensing unit to determine the magnetic properties of the measurement region.

In other words, the intensity of the magnetic field generated by the magnetic field generating unit or the frequency of the microwaves emitted from the microwave guide unit may be set by the control of the signal processing unit.

Furthermore, the signal processing unit obtains, from information on the electrical signal received from the sensing unit, frequency (or resonance frequency), and the magnetic field (or resonance magnetic field), at least one of information including a change in effective saturation magnetization $M_{eff}$, a change in effective damping constant $\alpha_{eff}$, a thickness t of a ferromagnetic layer, and zero-frequency full width at half maximum based $\Delta H_0$ on the following equation.

$$f_0 = \frac{\gamma}{2\pi}\sqrt{H_0(H_0 + 4\pi M_{eff})}$$

-continued $$M_{eff} = M_s + \frac{H_s}{4\pi}, \quad H_s = \frac{2K_A}{t \cdot M_S}$$

$$\Delta H_{eff}(f_0) = \left(\frac{4\pi\alpha_{eff}}{\gamma}f_0 + \Delta H_0\right)$$

$$\alpha_{eff} = \alpha_{FM} + \alpha_{SP} + \alpha_{MA}$$

(Herein, $f_0$: resonance frequency,
$H_0$: resonance magnetic field,
$\gamma$: gyro magnetic ration,
$M_{eff}$: effective saturation magnetization,
$M_S$: saturation magnetization,
$H_B$: uniaxial anisotropy magnetic field,
$K_A$: uniaxial anisotropy constant,
t: the thickness of the ferromagnetic layer,
$\alpha_{eff}$: effective damping constant,
$\alpha_{FM}$: damping constant of a ferromagnetic material itself,
$\alpha_{SP}$: spin-pumping damping constant according to bonding of a metal material to the ferromagnetic material,
$\alpha_{MA}$: damping constant due to an interface between the ferromagnetic material and the metal material,
$\Delta H_{eff}$: effective full width at half maximum,
$\Delta H_0$: the zero-frequency full width at half maximum.).

In particular, in a case where data of the effective saturation magnetization depending on the thickness or the volume of a specific material is secured in advance, the thickness of the thin film can be calculated inversely, thus being utilized for thickness inspection.

Accordingly, it is possible to determine whether the magnetic thin film 22 formed on the wafer 20 is properly formed or not.

Meanwhile, in a case where the microwaves are emitted to the magnetic thin film of the wafer and generate resonance, heat is generated in a part where the resonance is generated. Accordingly, it is preferable that a thermal imaging camera is provided to detect the part of the wafer where the generation of heat due to the resonance is abnormal and to check the magnetic thin film formed on the wafer for defects.

As described above, the wafer inspection apparatus according to the present invention can measure and inspect the magnetic properties of the magnetic thin film formed on the wafer in a non-destructive manner in which the wafer is not damaged for sample preparation.

In particular, the magnetic field generating unit and the microwave guide unit are not allowed to come into contact with the magnetic thin film formed on the wafer during the measurement, so that the wafer may not be physically damaged during the measurement. In addition, it is possible to perform the measurement directly on the wafer itself on which the magnetic thin film, thus improving productivity and quality.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:
1. A wafer inspection apparatus, comprising:
   a magnetic field generating unit forming a magnetic field such that magnetic lines of force flow in a direction perpendicular to a first surface of a wafer on which a magnetic film is formed and the magnetic lines of force also flow in a direction parallel to the first surface of the wafer;

a microwave guide unit emitting microwaves to a measurement region that is at least a partial region of the wafer and is a region affected by the magnetic field generated by the magnetic field generating unit, the microwave guide unit being arranged to be distanced from the first surface of the wafer by a predetermined distance when emitting microwaves; and a sensing unit receiving waves reflected or transmitted after the microwaves are emitted to the measurement region from the microwave guide unit.

2. The wafer inspection apparatus of claim 1, wherein the sensing unit includes at least one of an antenna, a pick up coil, and a waveguide.

3. The wafer inspection apparatus of claim 1, further comprising:

a wafer stage supporting at least a part of the wafer, wherein the wafer stage allows the wafer to be changed in position such that the measurement region on the wafer is changed in position.

4. The wafer inspection apparatus of claim 3, wherein a motion type in which the wafer is changed in position by the wafer stage includes at least one of a linear motion, a curved motion, and a vibration motion.

5. The wafer inspection apparatus of claim 1, further comprising:

a position adjustment unit changing a relative position of at least one of the magnetic field generating unit, the microwave guide unit, and the sensing unit with respect to an arbitrary point on the wafer, such that the measurement region on the wafer is changed in position.

6. The wafer inspection apparatus of claim 1, wherein the magnetic field generating unit includes:

a magnetic body inducing the magnetic lines of force in a direction toward the wafer; and a coil wound so as to surround at least a part of the magnetic body such that electric power is supplied from outside and the magnetic lines of force are induced from the magnetic body to form the magnetic field.

7. The wafer inspection apparatus of claim 6, wherein the magnetic body has at least a part having one of E, I, J, L, and U shapes.

8. The wafer inspection apparatus of claim 6, further comprising:

an adiabatic material provided between the coil and the wafer to prevent heat generated in the coil from being transmitted to the wafer.

9. The wafer inspection apparatus of claim 6, wherein the magnetic body is one of a permanent magnet and an electromagnet, or is composed of a combination of the permanent magnet and the electromagnet.

10. The wafer inspection apparatus of claim 6, wherein the coil includes:

a DC coil forming a DC magnetic field by being supplied with DC power from the outside; and an AC coil forming an AC magnetic field by being supplied with AC power from the outside.

11. The wafer inspection apparatus of claim 10, wherein intensity of the DC magnetic field formed by the DC coil is greater than intensity of the AC magnetic field formed by the AC coil.

12. The wafer inspection apparatus of claim 1, wherein the microwave guide unit includes:

a first rectangular waveguide emitting the microwaves to the measurement region where the magnetic lines of force are transmitted in the direction perpendicular to the first surface of the wafer by the magnetic field generating unit.

13. The wafer inspection apparatus of claim 1, wherein the microwave guide unit includes:

a second rectangular waveguide emitting the microwaves to the measurement region where the magnetic lines of force are formed in the direction parallel to the first surface of the wafer.

14. The wafer inspection apparatus of claim 1, wherein the microwave guide unit includes:

a coplanar waveguide emitting the microwaves to the measurement region.

15. The wafer inspection apparatus of claim 1, wherein the microwave guide unit includes:

a first rectangular waveguide emitting the microwaves to the measurement region where the magnetic lines of force are transmitted in the direction perpendicular to the first surface of the wafer by the magnetic field generating unit;

a second rectangular waveguide emitting the microwaves to the measurement region where the magnetic lines of force are formed in the direction parallel to the first surface of the wafer; and a coplanar waveguide emitting the microwaves to the measurement region.

16. The wafer inspection apparatus of claim 15, wherein the first rectangular waveguide and the coplanar waveguide are arranged to be distanced from the first surface of the wafer by a predetermined distance, and the second rectangular waveguide is arranged to be distanced from a second surface of the wafer by a predetermined distance, so that the microwaves are emitted to the measurement region.

17. The wafer inspection apparatus of claim 1, further comprising:

a signal processing unit receiving an electrical signal from the sensing unit and analyzing the received electrical signal, wherein the sensing unit receives the waves reflected or transmitted and converts the received waves into the electrical signal, and the signal processing unit analyzes information on the electrical signal received from the sensing unit, frequency of the microwaves emitted to the measurement region, and the magnetic field applied to the measurement region by the magnetic field generating unit and thus obtains magnetic information on the measurement region of the wafer.

18. The wafer inspection apparatus of claim 17, wherein the signal processing unit obtains, from the information on the electrical signal, the frequency, and the magnetic field, at least one of information including a change in effective saturation magnetization $M_{eff}$, a change in effective damping constant $\alpha_{eff}$, a thickness $t$ of a ferromagnetic layer, and zero-frequency full width at half maximum $\Delta H_C$ based on the following equation, $$f_0 = \frac{\gamma}{2\pi}\sqrt{H_0(H_0 + 4\pi M_{eff})}$$

$$M_{eff} = M_s + \frac{H_s}{4\pi}, \quad H_s = \frac{2K_A}{t \cdot M_S}$$

-continued $$\Delta H_{eff}(f_0) = \left(\frac{4\pi\alpha_{eff}}{\gamma} f_0 + \Delta H_0\right)$$

$$\alpha_{eff} = \alpha_{FM} + \alpha_{SP} + \alpha_{MA}$$

(Herein, $f_0$: resonance frequency,
$H_0$: resonance magnetic field,
$\gamma$: gyro magnetic ration,
$M_{eff}$: effective saturation magnetization,
$M_B$: saturation magnetization,
$H_B$: uniaxial anisotropy magnetic field,
$K_A$: uniaxial anisotropy constant,
t: the thickness of the ferromagnetic layer,
$\alpha_{eff}$: effective damping constant,
$\alpha_{FM}$: damping constant of a ferromagnetic material itself,
$\alpha_{SP}$: spin-pumping damping constant according to bonding of a metal material to the ferromagnetic material,
$\alpha_{MA}$: damping constant due to an interface between the ferromagnetic material and the metal material,
$\Delta H_{eff}$: effective full width at half maximum,
$\Delta H_0$: the zero-frequency full width at half maximum).

* * * * *